(12) United States Patent
Yean et al.

(10) Patent No.: US 9,447,675 B2
(45) Date of Patent: *Sep. 20, 2016

(54) IN-SITU METHOD AND SYSTEM FOR REMOVING HEAVY METALS FROM PRODUCED FLUIDS

(71) Applicant: Chevron U.S.A. Inc., San Ramon, CA (US)

(72) Inventors: Sujin Yean, Houston, TX (US); Darrell Lynn Gallup, Meridian, ID (US); Lyman Arnold Young, San Ramon, CA (US); Russell Evan Cooper, Martinez, CA (US); Matthew Bernard Zielinski, Missouri City, TX (US); Mark Anthony Emanuele, Bellaire, TX (US); Brian Christopher Llewellyn, Kingwood, TX (US); Dennis John O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/896,255

(22) Filed: May 16, 2013

(65) Prior Publication Data

US 2014/0151040 A1    Jun. 5, 2014

Related U.S. Application Data

(60) Provisional application No. 61/647,983, filed on May 16, 2012.

(51) Int. Cl.
*E21B 43/16*    (2006.01)
*E21B 43/38*    (2006.01)
(Continued)

(52) U.S. Cl.
CPC ............... *E21B 43/38* (2013.01); *C09K 8/52* (2013.01); *E21B 43/16* (2013.01); *E21B 43/26* (2013.01); *E21B 43/34* (2013.01); *E21B 43/40* (2013.01)

(58) Field of Classification Search
CPC ...... E21B 43/243; E21B 21/00; E21B 21/08; E21B 43/34; E21B 43/40; E21B 43/16; E21B 43/38; E21B 43/36; B01D 53/64; B01D 2257/602
See application file for complete search history.

(56) References Cited

U.S. PATENT DOCUMENTS 3,083,764 A    4/1963  Gaskell et al.
3,873,581 A    3/1975  Fitzpatrick et al.
(Continued)

FOREIGN PATENT DOCUMENTS

WO    2012-036986    2/2012
WO    2013033492     3/2013

OTHER PUBLICATIONS

International Search Report for International Application No. PCT/US2012/041433 dated Aug. 14, 2013, 3 pages.
(Continued)

*Primary Examiner* — Zakiya W Bates
(74) *Attorney, Agent, or Firm* — Howard V. Owens

(57) ABSTRACT

Methods and systems relate to the in-situ removal of heavy metals such as mercury, arsenic, etc., from produced fluids such as gases and crudes from a subterranean hydrocarbon-bearing formation. A sufficient amount of a fixing agent is injected into formation with a dilution fluid. The fixing agent reacts with the heavy metals forming precipitate, or is extracted heavy metals into the dilution fluid as soluble complexes. In one embodiment, the heavy metal precipitates remain in the formation. After the recovery of the produced fluid, the dilution fluid containing the heavy metal complexes is separated from the produced fluid, generating a treated produced fluid having a reduced concentration of heavy metals. In one embodiment, the dilution fluid is water, and the wastewater containing the heavy metal complexes after recovery can be recycled by injection into a reservoir.

24 Claims, 1 Drawing Sheet

(51) Int. Cl.
*E21B 43/26* (2006.01)
*E21B 43/34* (2006.01)
*E21B 43/40* (2006.01)
*C09K 8/52* (2006.01)

(56) References Cited

U.S. PATENT DOCUMENTS

| | | | |
|---|---|---|---|
| 4,028,236 | A | 6/1977 | Townsend et al. |
| 4,094,098 | A | 6/1978 | Gourley |
| 4,094,777 | A | 6/1978 | Sugier et al. |
| 4,108,769 | A | 8/1978 | Krieg et al. |
| 4,133,755 | A | 1/1979 | Tarao et al. |
| 4,149,598 | A | 4/1979 | Christian |
| 4,151,077 | A | 4/1979 | Nogueira et al. |
| 4,167,481 | A | 9/1979 | Cremers et al. |
| 4,230,486 | A | 10/1980 | Capuano et al. |
| 4,336,237 | A | 6/1982 | Kudryk et al. |
| 4,338,288 | A | 7/1982 | Rollmann |
| 4,354,942 | A | 10/1982 | Kaczur et al. |
| 4,551,237 | A | 11/1985 | Fenton |
| 4,578,195 | A | 3/1986 | Moore et al. |
| 4,619,744 | A | 10/1986 | Horton |
| 4,678,584 | A | 7/1987 | Elfline |
| 4,708,853 | A | 11/1987 | Matviya et al. |
| 4,709,118 | A | 11/1987 | Yan |
| 4,752,397 | A | 6/1988 | Sood |
| 4,876,025 | A | 10/1989 | Roydhouse |
| 4,877,515 | A | 10/1989 | Audeh |
| 4,880,527 | A | 11/1989 | Audeh |
| 4,902,662 | A | 2/1990 | Toulhoat et al. |
| 4,915,818 | A | 4/1990 | Yan |
| 4,981,577 | A | 1/1991 | Audeh et al. |
| 4,985,389 | A | 1/1991 | Audeh |
| 5,034,203 | A | 7/1991 | Audeh et al. |
| 5,037,552 | A | 8/1991 | Furuta et al. |
| 5,107,060 | A | 4/1992 | Yan |
| 5,110,480 | A | 5/1992 | Yan |
| 5,173,286 | A | 12/1992 | Audeh |
| 5,202,301 | A | 4/1993 | McNamara |
| 5,238,488 | A | 8/1993 | Wilhelm |
| 5,304,693 | A | 4/1994 | Boitiaux et al. |
| 5,336,835 | A | 8/1994 | McNamara |
| 5,360,632 | A | 11/1994 | Johnson et al. |
| 5,407,009 | A | 4/1995 | Butler et al. |
| 5,961,821 | A | 10/1999 | Varadaraj et al. |
| 6,268,543 | B1 | 7/2001 | Sakai et al. |
| 6,350,372 | B1 | 2/2002 | Degnan et al. |
| 6,403,044 | B1 | 6/2002 | Litz et al. |
| 6,475,451 | B1 | 11/2002 | Leppin et al. |
| 6,521,131 | B1 | 2/2003 | Hamilton et al. |
| 6,685,824 | B2 | 2/2004 | Frankiewicz et al. |
| 6,866,048 | B2 | 3/2005 | Mattox |
| 6,906,398 | B2 | 6/2005 | Yeo et al. |
| 6,960,291 | B2 | 11/2005 | Greaney et al. |
| 7,037,474 | B2 | 5/2006 | Nolan et al. |
| 7,093,655 | B2 | 8/2006 | Atkinson |
| 7,591,944 | B2 | 9/2009 | Carnell et al. |
| 7,666,318 | B1 | 2/2010 | Lehtinen et al. |
| 7,744,763 | B2 | 6/2010 | Cross et al. |
| 7,775,278 | B2 | 8/2010 | Willberg et al. |
| 2003/0075484 | A1 | 4/2003 | Sakai et al. |
| 2005/0263739 | A1 | 12/2005 | Mattox et al. |
| 2006/0048646 | A1 | 3/2006 | Olson et al. |
| 2007/0246426 | A1 | 10/2007 | Collins |
| 2008/0196892 | A1 | 8/2008 | Lau et al. |
| 2008/0283470 | A1 | 11/2008 | Gustafsson et al. |
| 2009/0114247 | A1 | 5/2009 | Brown et al. |
| 2009/0261040 | A1 | 10/2009 | Pruet |
| 2009/0288825 | A1 | 11/2009 | Tang |
| 2009/0304563 | A1 | 12/2009 | Harada et al. |
| 2009/0308609 | A1 | 12/2009 | Curole et al. |
| 2010/0000910 | A1 | 1/2010 | Gallup et al. |
| 2010/0025184 | A1 | 2/2010 | Shibuya et al. |
| 2010/0032344 | A1 | 2/2010 | Cross et al. |
| 2010/0032345 | A1 | 2/2010 | Cross et al. |
| 2010/0078358 | A1 | 4/2010 | Tullos et al. |
| 2010/0089584 | A1* | 4/2010 | Burns .......................... 166/302 |
| 2010/0099596 | A1 | 4/2010 | Trahan |
| 2010/0126909 | A1 | 5/2010 | Bhasin et al. |
| 2010/0147742 | A1 | 6/2010 | Ozum |
| 2010/0155330 | A1 | 6/2010 | Burba et al. |
| 2010/0175896 | A1 | 7/2010 | Owen |
| 2010/0200465 | A1 | 8/2010 | Dana et al. |
| 2010/0200477 | A1 | 8/2010 | Varadi et al. |
| 2010/0320124 | A1 | 12/2010 | Zhang et al. |
| 2011/0163008 | A1 | 7/2011 | Zhang et al. |
| 2011/0247811 | A1 | 10/2011 | Beer |
| 2011/0253375 | A1 | 10/2011 | Jamaluddin et al. |
| 2012/0073811 | A1 | 3/2012 | Mock |
| 2012/0190598 | A1* | 7/2012 | McCubbins et al. ......... 507/270 |
| 2013/0056204 | A1* | 3/2013 | McDaniel ................ C09K 8/80 166/280.1 |

OTHER PUBLICATIONS

Pending U.S. Appl. No. 12/109,194, filed Apr. 24, 2008.
Pending U.S. Appl. No. 12/132,475, filed Jun. 3, 2008.
Pending U.S. Appl. No. 12/167,466, filed Jul. 3, 2008.
Pending U.S. Appl. No. 12/883,578, filed Sep. 16, 2010.
Pending U.S. Appl. No. 12/883,921, filed Sep. 16, 2010.
Pending U.S. Appl. No. 12/883,971, filed Sep. 16, 2010.
Pending U.S. Appl. No. 12/883,995, filed Sep. 16, 2010.
Pending U.S. Appl. No. 12/950,060, filed Nov. 19, 2010.
Pending U.S. Appl. No. 12/950,170, filed Nov. 19, 2010.
Pending U.S. Appl. No. 12/950,637, filed Nov. 19, 2010.
Pending U.S. Appl. No. 13/299,436, filed Nov. 16, 2011.
Pending U.S. Appl. No. 13/804,172, filed Mar. 14, 2013.
Pending U.S. Appl. No. 13/804,430, filed Mar. 14, 2013.
Pending U.S. Appl. No. 13/804,662, filed Mar. 14, 2013.
Pending U.S. Appl. No. 13/826,213, filed Mar. 14, 2013.
Pending U.S. Appl. No. 13/895,612, filed May 16, 2013.
Pending U.S. Appl. No. 13/895,754, filed May 16, 2013.
Pending U.S. Appl. No. 13/895,850, filed May 16, 2013.
Pending U.S. Appl. No. 13/895,983, filed May 16, 2013.
Pending U.S. Appl. No. 13/896,242, filed May 16, 2013.
Ashworth, S. C., "Mercury Removal at Idaho National Engineering and Environmentally Laboratory's New Waste Calciner Facility," *Waste Management*, Feb. 27-Mar. 2, 2000, INEEL, Bechtel BWXT Idaho, LLC, Tucson, AZ, pp. 1-20.
Campanella et al., "Mercury Removal from Petrochemical Wastes," *Water Research*, 1986, vol. 20, No. 1, pp. 63-65.
Carnell et al., "Mercury Matters," *Hydrocarbon Engineering*, Dec. 2005, 3 pages.
Chaiyasit et al., "Decontamination of Mercury Contaminated Steel (API 5L-X52) Using Iodine and Iodide Lixiviant," *Modern Applied Science*, Jan. 2010, vol. 4, No. 1, pp. 12-20.
Clever et al., "The Solubility of Mercury and Some Sparingly Soluble Mercury Salts in Water and Aqueous Electrolyte Solutions," *Journal of Physical and Chemical Reference Data*, 1895, vol. 14, No. 3, pp. 631-680.
Corvini et al., "Mercury Removal from Natural Gas and Liquid Streams," *UOP LLC*, 2002, Houston, TX, pp. 1-9.
Findlay et al., "Removal of Elemental Mercury from Wastewaters Using Polysulfides," *Environmental Science and Technology*, Nov. 1981, vol. 15, No. 11, pp. 1388-1390.
Gildert et al., "Mercury Removal from Liquid Hydrocarbons in Ethylene Plants," *AIChE Paper* No. 135c, Mar. 24, 2010, Spring National Meeting, San Antonio, TX, 14 pages.
Kim et al., "Demulsification of Water-In-Crude Oil Emulsions by a Continuous Electrostatic Dehydrator," *Separation Science and Technology*, 2002, vol. 37, No. 6, pp. 1307-1320.
Larson et al., "Mass-Transfer Model of Mercury Removal from Water via Microemulsion Liquid Membranes," *Industrial & Engineering Chemisty Research*, 1994, vol. 33, No. 6, pp. 1612-1619.
Lemos et al., "Demusification of Water-in-Crude Oil Emulsions Using Ionic Liquids and Microwave Irradiation," *Energy Fuels*, 2010, vol. 24, pp. 4439-4444.

(56) References Cited

OTHER PUBLICATIONS

Morel et al., "The Chemical Cycle and Bioaccumulation of Mercury," *Annual Review Ecology, Evolution, and Systematics*, 1998, vol. 29, pp. 543-566.

Núñez et al., "Leaching of Cinnabar with HCl-Thiourea Solutions as the Basis of a Process for Mercury Obtention," *Metallurgical Transactions B*, Sep. 1996, vol. 17B, pp. 443-448.

Sharma et al., "Chemical Demulsification of Natural Petroleum Emulsions of Assam (India)," *Colloid & Polymer Science*, 1982, vol. 260, pp. 616-622.

Sizeneva et al., "Applied Electrochemistry and Corrosion Protection of Metals: Mercury Passivation Solutions of Potassium Chloride and Sodium Hydroxide and Hypochlorite," *Russian Journal of Applied Chemistry*, 2009, vol. 82, No. 1, pp. 52-56.

Sizeneva et al., "Inorganic Synthesis and Industrial Inorganic Chemistry: A Study of Mercury Dissolution in Aqueous Solutions of Sodium Hypochlorite," *Russian Journal of Applied Chemistry*, 2005, vol. 78, No. 4, pp. 546-548.

Venkatesan et al., "Removal of Complexed Mercury by Dithiocarbamate Grafted on Mesoporous Silica," *Journal of Radioanalytical and Nuclear Chemistry*, 2003, vol. 256, No. 2, pp. 213-218.

Waldo, John H., "Some New Water-Soluble Organo-Mercury Compounds," *Water Soluble Organo Compounds*, Mar. 6, 1931, vol. 53, pp. 992-996.

Wasay et al., "Remediation of a Soil Polluted by Mercury with Acidic Potassium Iodide," *Journal of Hazardous Materials*, 1995, vol. 44, pp. 93-102.

Yuan et al., "Fractions and Leaching Characteristics of Mercury in Coal," *Environmental Monitoring and Assessment*, Jan. 6, 2009, vol. 167, pp. 581-586.

Zhao et al., "Removal of Elemental Mercury by Sodium Chlorite Solution," *Chemical Engineering & Technology*, 2008, vol. 31, No. 3, pp. 350-354.

Supplementary European Search Report dated Feb. 16, 2016 for European Application No. 13791572.4.

\* cited by examiner

IN-SITU METHOD AND SYSTEM FOR REMOVING HEAVY METALS FROM PRODUCED FLUIDS

CROSS-REFERENCE TO RELATED APPLICATIONS

This application claims benefit under 35 USC 119 of U.S. patent application Ser. No. 61/647,983 with a filing date of May 16, 2012. This application claims priority to and benefits from the foregoing, the disclosures of which are incorporated herein by reference.

TECHNICAL FIELD

The invention relates generally to a process, method, and system for removing heavy metals including mercury from hydrocarbon fluids such as crude oil and gases.

BACKGROUND

Heavy metals can be present in trace amounts in all types of produced fluids such as hydrocarbon gases and crude oils. The amount can range from below the analytical detection limit to several thousand ppbw (parts per billion by weight) depending on the source.

Methods have been disclosed for in-situ treatment of fluid for heavy metal removal. US Patent Publication No. 2011/0253375 discloses an apparatus and related methods for removing mercury from reservoir effluent by placing materials designed to adsorb mercury into the vicinity of a formation at a downhole location, and letting the reservoir effluent flow through the volume of the adsorbing material. US Patent Publication No. 2012/0073811 discloses a method for mercury removal by injecting a solid sorbent into a wellbore intersecting a subterranean reservoir containing hydrocarbon products.

Production of oil and gas is usually accompanied by the production of water. The produced water may consist of formation water (water present naturally in the reservoir), or water previously injected into the formation. As exploited reservoirs mature, the quantity of water produced increases. Produced water is the largest single fluid stream in exploration and production operations. Every day, U.S. oil and gas producers bring to the surface 60 million barrels of produced water.

There is still a need for improved methods for the removal of heavy metals from produced streams right at the production source, particularly for the removal of mercury.

SUMMARY OF THE INVENTION

In one aspect, the invention relates to a method for recovering hydrocarbons from a subterranean hydrocarbon-bearing formation while simultaneously removing heavy metals from the hydrocarbons. The method comprises: exposing the heavy metals in the hydrocarbons to a fixing agent in a dilution fluid for the fixing agent to react with the heavy metals forming heavy metal complexes in the dilution fluid; and recovering the hydrocarbons and the dilution fluid containing the heavy metal complexes from the formation via a production well as a mixture.

In another aspect, the invention relates to a method for recovering hydrocarbons from a subterranean hydrocarbon-bearing formation while simultaneously removing heavy metals from the hydrocarbons. The method comprises: exposing the heavy metals in the hydrocarbons to a fixing agent in a dilution fluid for the fixing agent to react with the heavy metals forming insoluble heavy metal complexes that precipitate and remain in the reservoir; and recovering the hydrocarbons and the dilution fluid containing the heavy metal complexes from the formation via a production well as a mixture.

In another aspect, the invention relates to another method for recovering hydrocarbons from a subterranean hydrocarbon-bearing formation while simultaneously removing heavy metals from the hydrocarbons. The method comprises: fracturing the formation to generate fractures; providing a dilution fluid containing a fixing agent for the fixing agent to react with the heavy metals in the formation, forming heavy metal complexes in the dilution fluid; recovering the dilution fluid containing the heavy metal complexes; and recovering hydrocarbons having a reduced concentration of heavy metals from the formation via a production well.

In another aspect, the invention relates to an in-situ method for removing heavy metals from the hydrocarbons while recovering the hydrocarbons from a subterranean hydrocarbon-bearing formation. The method comprises: fracturing the formation to generate fractures; providing a dilution fluid containing a fixing agent for at least a portion of the fixing agent to be adsorbed into fractures and rocks in the formation; reducing the pressure for the dilution fluid to flow back through a well bore; allowing the hydrocarbons to pass through the fractures and rocks having the fixing agent adsorbed thereon, wherein heavy metals in the hydrocarbons react with the fixing agent forming heavy metal complexes; and recovering the hydrocarbons from the formation via a well bore.

In another aspect, the invention relates to a method for recovering hydrocarbons from a subterranean hydrocarbon-bearing formation while simultaneously removing heavy metals from the hydrocarbons. The method comprises: fracturing the formation to generate fractures; providing a dilution fluid containing a fixing agent for the fixing agent to diffuse into fractures and rocks in the formation to react with the heavy metals in the hydrocarbons; recovering the dilution fluid containing the heavy metal complexes; and recovering hydrocarbons having a reduced concentration of heavy metals from the formation via a production well.

In yet another aspect, the invention relates to a system for the in-situ removal of heavy metals hydrocarbons in recovering the hydrocarbons from a subterranean hydrocarbon-bearing formation. The system comprises: a well drilled into an underground formation comprising hydrocarbons and a topside production facility. The topside production facility is for the storage and treatment of produced water recovered from a subterranean formation, and the injection of the treated produced water containing the fixing agent into the well.

DETAILED DESCRIPTION

Figure 1:
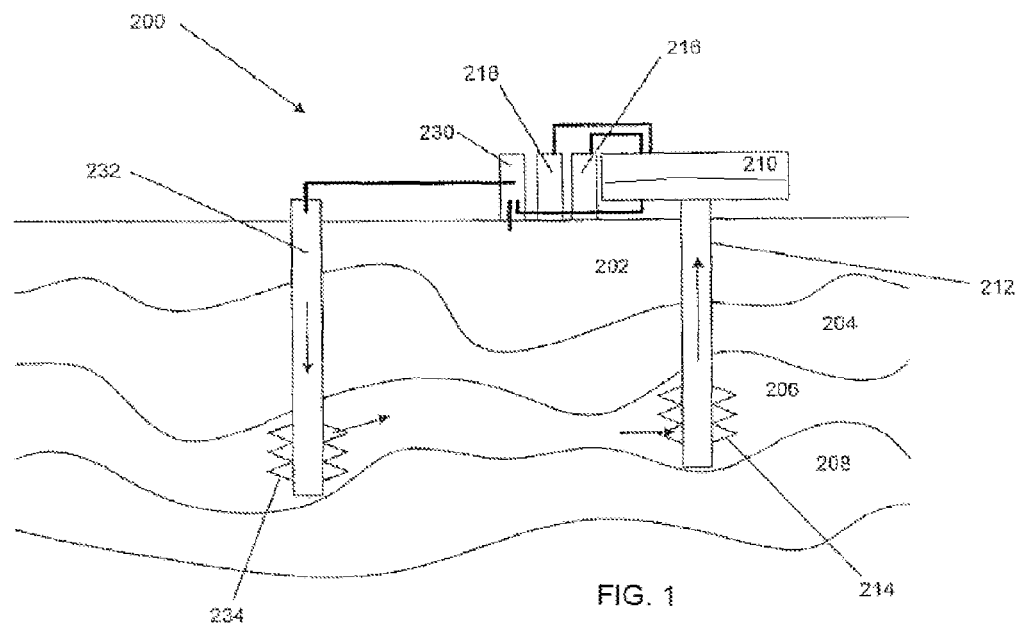
FIG. 1 is a diagram of an embodiment of an in-situ system for the removal of heavy metals from a produced fluid.

The following terms will be used throughout the specification and will have the following meanings unless otherwise indicated.

"Hydrocarbons" refers to hydrocarbon streams such as crude oils and/or natural gases.

"Produced fluids" refers hydrocarbon gases and/or crude oil. Produced fluids may be used interchangeably with hydrocarbons.

"Crude oil" refers to a hydrocarbon material, including to both crude oil and condensate, which is typically in liquid form. Under some formation conditions of temperature and/or pressure, the crude may be in a solid phase. Under some conditions, the oil may be in a very viscous liquid phase that flows slowly, if at all.

"Production well" is a well through which produced fluids are carried from an oil-bearing geological formation to the earth's surface, whether the surface is water or land. Surface facilities are provided for handling and processing the crude from the formation as it arrives on the surface.

"Topside production facility" refers to the surface hardware on an offshore oil platform or connected group of platforms, such as the oil production plant and the drilling rig.

"Injection well" is a well through which at least a treatment agent is passed from the surface facilities into the geological formation. In one embodiment, a well is alternatively employed in a producing and an injection mode. The well is alternatively employed for injecting a material into the formation for some period of time. The process conditions within the well are then adjusted to permit crude to flow into the well, from where it is withdrawn to surface facilities.

"Trace amount" refers to the amount of heavy metals in a produced fluid. The amount varies depending on the source of the fluid and the type of heavy metal, for example, ranging from a few ppb to up to 30,000 ppb for mercury and arsenic.

"Heavy metals" refers to gold, silver, mercury, osmium, ruthenium, uranium, cadmium, tin, lead, selenium, and arsenic. While the description described herein refers to mercury removal, in one embodiment, the treatment removes one or more of the heavy metals.

"Flow-back water" refers to water that flows back to the surface after being placed into a subterranean formation as part of an enhanced oil recovery operation, e.g., a hydraulic fracturing operation.

"Produced water" refers to the water generated in the production of oil and gas, including formation water (water present naturally in a reservoir), as well as water previously injected into a formation either by matrix or fracture injection, which can be any of connate water, aquifer water, seawater, desalinated water, flow-back water, industrial by-product water, and combinations thereof.

"Mercury sulfide" may be used interchangeably with HgS, referring to mercurous sulfide, mercuric sulfide, or mixtures thereof, which can be in any common phases of cinnabar, meta-cinnabar, hyper-cinnabar and combinations thereof. Mercury sulfide is typically present as mercuric sulfide with a stoichiometric equivalent of one mole of sulfide ion per mole of mercury ion.

The invention relates to a method for the in-situ removal of heavy metals such as mercury, arsenic, etc., from produced fluids such as gases and crudes from a subterranean hydrocarbon bearing formation. In the course of extracting the produced fluids from the formation, a fixing agent is injected in the formation, which reacts with the heavy metals and forms precipitates and/or soluble heavy metal compounds. The amount of precipitates or soluble heavy metal compounds formed depends on the type of mercury present in the formation, as well as well as the amount and type of fixing agent(s) employed.

Produced Fluids Containing Heavy Metals: Heavy metals such as lead, zinc, mercury, silver, selenium, arsenic and the like can be present in trace amounts in all types of hydrocarbon streams such as crude oils and natural gases. Producers may desire to remove heavy metals such as mercury and lead from crude oil. The amount of mercury and/or arsenic can range from below the analytical detection limit to several thousand ppb depending on the feed source.

Arsenic species can be present in produced fluids in various forms including but not limited to triphenylarsine ($Ph_3As$), triphenylarsine oxide ($Ph_3AsO$), arsenic sulfide minerals (e.g., $As_4S_4$ or asS $As_2S_3$), metal arsenic sulfide minerals (e.g., FeAsS; (Co, Ni, Fe)AsS; (Fe, Co)AsS), arsenic selenide (e.g., $As_2Se_5$, $As_2Se_3$), arsenic-reactive sulfur species, organo-arsenic species, and inorganic arsenic held in small water droplets.

Mercury can be present in produced fluids as elemental mercury $Hg^0$, ionic mercury, inorganic mercury compounds, and/or organic mercury compounds. Examples include but are not limited to: mercuric halides, mercurous halides, mercuric oxides, mercuric sulfide, mercuric sulfate, mercurous sulfate, mercury selenide, mercury hydroxides, organo-mercury compounds and mixtures of thereof. Mercury can be present as particulate mercury, which can be removed from hydrocarbons by filtration or centrifugation. The particulate mercury in one embodiment is predominantly non-volatile.

In one embodiment, the produced fluid is a crude oil containing at least 50 ppbw mercury. In another embodiment, the mercury level is at least 100 ppbw. In one embodiment of a mercury-containing crude, less than 50% of the mercury can be removed by stripping (or more than 50% of the mercury is non-volatile). In another embodiment, at least 65% of the mercury in the crude is non-volatile. In a third embodiment, at least 75% of the mercury is of the particulate or non-volatile type.

In-situ Removal of Heavy Metals: In one embodiment, the removal of heavy metals such as mercury and arsenic is simultaneous with the recovery of a produced fluid in a subterranean reservoir with the injection of a dilution fluid. In this method, a sufficient amount of fixing agent is added to the formation for the removal of heavy metals as oil and/or gas is being produced in the well.

The in-situ removal occurs simultaneously with a water flooding in one embodiment, and with a fracturing process in another embodiment. Fracturing is a method for increasing the production of crude oil and gas from a fractured reservoir. Fractures can be generated in formations by means known in the art, e.g., pulsed power energy, gas fracturing, explosion, plasma stimulation, hydraulic fracturing, etc. Water injection or waterflooding is a widely applied method of improved oil recovery, wherein water is used as the dilution fluid for injecting into the rock formation through a system of injection boreholes to facilitate recovery of hydrocarbons from subsurface formations. In one embodiment, a fracturing fluid is injected into the well at a rate and pressure sufficient to propagate a fracture adjacent to or in the well.

The fracturing fluid is allowed to soak into the formation rock for a period of time, ranging from hours to days. The fracturing fluid is a dilution fluid which contains propping agents to maintain the fracture in a propped condition when the applied pressure is relieved, as well as a sufficient amount of a fixing agent for the removal of heavy metals.

The fracturing fluid can also be an acid, e.g., HCl, to etch the fracture faces in the formation to form conductive channels facilitating the oil recovery.

In one embodiment, at least a portion of the fixing agent diffuses into the formation fractures and reacts with the heavy metals embedded in the formation, forming heavy metal complexes in the fracturing (dilution) fluid. In one embodiment, after the pressure is reduced and the direction of the fluid flow is reversed, the fluid containing extracted heavy metals flows back to the surface for recovery and subsequent treatment to remove extracted heavy metals and other contaminants. In another embodiment, at least a portion of the fixing agent adsorbs onto the reservoir rock in the soaking process, for "treated rock" with embedded fixing agent.

When the flow is reversed and the hydrocarbons pass over the treated rock, the heavy metal reacts with the embedded fixing agent forming heavy metal complexes. In some embodiment, the heavy metal complexes are embedded and stay in the formation fractures for a produced fluid when recovered from the production well to effectively have a lower heavy metal concentration than a produced fluid from a well without the fixing agent in the fracture fluid.

At least 25% of the heavy metal complexes stay in the formation fractures in one embodiment, at least 50% of the heavy metal complexes remain in the formation fractures in a second embodiment; and at least 75% in a third embodiment. When the fixing reagent is exhausted from the formation, increasing amounts of heavy metals will be detected in the recovered produced fluids so that a new supply of fixing agent can be injected into the formation.

In one embodiment, the amount of heavy metals such as mercury remaining in the formation can be determined by measuring concentration of in-situ formation material before and after drilling and coring. The amount can be determined by analyses of adsorption on samples from the formation, e.g., core samples, cutting waste, produced water from the formation, etc.

In one embodiment, the fixing agent is added to a dilution fluid such as water for injection into the well, during any stage of the recovery, and on a continuous or intermittent basis. It can be added to the dilution fluid along with other additives, e.g., proppants, surfactants, electrolytes, etc. The fixing agent can also be added to the production well as a separate feed from the dilution fluid. It can be injected into the production well within less than thirty days of the injection of the dilution fluid or periodically over a period of a few months to allow for the soaking of the reservoir. The fixing agent can be provided in a dispenser with perforations positioned in the production tubing for continuous slow dissolution into the injected dilution fluid, as disclosed in US Patent Publication No. 2011/0162841, the relevant disclosure is included herein by reference.

In one embodiment after the injection of the fixing agent into the reservoir, the well can be shut-in for some period of time to allow the fixing agent and optionally, other additives such as surfactants, etc., to imbibe into the matrix rock and thereby react with the heavy metals present in the oil, as the dilution fluid displaces the oil into the fracture system.

The shut-in time can range from 2 hours to hundreds of days in one embodiment, and 2-10 days in another embodiment, and less than 30 days in a third embodiment.

In another embodiment of another in-situ removal process, the fixing agent as dissolved in the injected dilution fluid flows through the subsurface or formation passageways reacts with the heavy metals forming metal complexes, where the heavy metal complexes are extracted from the produced fluid into the dilution fluid for subsequent recovery. The injected dilution fluid such as water contains a sufficient amount of fixing agent, so as the water flows through subsurface or formation passageways may include pores in the formation matrix, fractures, voids, cavities, perforations and fluid passages through the wells, including cased and uncased wells, tubings and other fluid paths in the wells, causing the hydrocarbons trapped in the formation to move toward the production well. In the process, the fixing agent in the injected water reacts and extracts the heavy metals from the produced fluids into the injected water. The injected water travels through the rock formation at a speed of 0.1 to 20 m/day in one embodiment. In another embodiment, the water is heated while within the formation which facilitates the in-situ removal of heavy metals.

After the in-situ reaction and recovery of the produced fluid and injected water from the reservoir, the wastewater containing the heavy metal complexes is separated from the crude in a phase separation device known in the art, resulting in a crude oil with a significantly reduced level of heavy metals and a wastewater stream. In one embodiment after the recovery of a mixture of produced fluid such as crude oil and dilution fluid containing heavy metal complexes from the formation, additional chemical reagents such as complexing agents can be added to the mixture to facilitate the oil/water separation.

For an onshore or in sensitive near-shore environments, the water phase after separation is diverted to treatment systems before re-injection back into the same reservoir or a different reservoir (after depletion), re-used for drilling or stimulation, or discharged where applicable or feasible. The water treatment is carried out to control any of excessive solids, dissolved oil, corrosion, chemical reactions, or growth of microbes. For an offshore application, the wastewater can be treated to remove oil and followed by discharge to the sea in compliance with relevant regulations.

Recovery of the treated crude oil with reduced levels of heavy metals, and treatment of the recovered water phase can be carried out using processes and equipment known in the art, including separators, hydroclone, mesh coalescer, filter, membrane, centrifuge and the like for the oil/water separation; ion exchange, electrodialysis, electrodialysis reversal, electrochemical, deionization, evaporation, electro-deionization, reverse osmosis, membrane separation, oxidation reactor, filtration, and combinations thereof can be used for the treatment of recovered water.

Diluent Fluid for the In-situ Reaction: The diluent fluid to be used for the in-situ reaction depends on the production fluids to be recovered, the state of the production, the location of the production well, amongst other factors.

In one embodiment for the in-situ removal of heavy metals in a produced fluid from wells in low permeability formations, the dilution fluid is a lighter hydrocarbon, e.g., pentane, diesel oil, gas oil, kerosene, gasoline, benzene, toluene, heptane, and the like. In one embodiment, the dilution fluid is non-potable water, e.g., connate water, aquifer water, seawater, desalinated water, oil field produced water, industrial by-product water, or combinations thereof, e.g., connate water, aquifer water, seawater, desalinated water, oil fields produced water, industrial by-product water, or combinations thereof. In one embodiment, the dilution fluid may be a mixture comprising a mixture of an oil phase in water. Besides the fixing agent, the dilution fluid may be augmented with other additives such as scale inhibitors, surfactants, proppants, etc. In one embodiment, the dilution fluid is from a water storage/treatment facility connected to a topside production facility, wherein produced water, seawater, etc., is recovered and prepared with the addition of additives, e.g., fixing agents needed for the removal of the heavy metals. The dilution fluid may be injected into the production well at cold, heated, or ambient temperature.

In one embodiment, the produced fluid such as crude oil is recovered in the same injection well for the dilution fluid and/or the fixing agent. In another embodiment, the recovery is through a second well located some distance from the injection well referred to above. In another embodiment, at least a portion of fixing agent may adsorb to the rock downhole or packing materials around the well. When hydrocarbons pass over the treated rock or the packing material, the fixing agent reacts with and extracts the heavy metals into the passing the dilution fluid for subsequent removal from the same production well, or a second well located some distance from the injection well. Dilution fluids are driven to the production well by formation re-compaction, fluid expansion and gravity.

The well-servicing amount of injected dilution fluid depends on a number of factors including but not limited to the composition and salinity of the dilution fluid employed, the properties of the produced fluid to be recovered, the amount of produced fluids to be recovered, the characteristics of the formation rock, and the maturity of the field. The well-servicing amount as the volume ratio of dilution fluid to produced fluid ranges from 1:3 to 60:1 in on embodiment, from 2:1 to 40:1 in a second embodiment, and from 10:1 to 30:1 in a third embodiment.

Fixing Agent: In one embodiment for the removal of arsenic and/or mercury, the fixing agent is a sulfur-based compound for forming sulfur complexes with the heavy metals. Examples include organic and inorganic sulfide materials (including polysulfides), which in some embodiments, convert the heavy metal complexes into a form which is more soluble in an aqueous dilution fluid than in a produced fluid such as shale oil. In one embodiment, the fixing agent is a water-soluble monatomic sulfur species, e.g., sodium sulfides and alkaline sulfides such as ammonium sulfides and hydrosulfides, for the extract of mercury into an aqueous dilution fluid as soluble mercury sulfur complexes, such as $HgS_2^{2-}$. In another embodiment, the sulfur-based compound is any of hydrogen sulfide, bisulfide salt, or a polysulfide, for the formation of precipitates which require separated from the treated produced fluid by filtration, centrifugation, and the like. In yet another embodiment, the fixing agent is an organic polysulfide such as di-tertiary-nonyl-polysulfide. In another embodiment, the sulfur-based compound is an organic compound containing at least a sulfur atom that is reactive with mercury as disclosed in U.S. Pat. No. 6,685,824, the relevant disclosure is included herein by reference. Examples include but are not limited to dithiocarbamates, sulfurized olefins, mercaptans, thiophenes, thiophenols, mono and dithio organic acids, and mono and dithiesters.

In another embodiment, the fixing agent is an oxidizing agent which converts the heavy metal to an oxidation state that is soluble in water. Examplary fixing agents include elemental halogens or halogen containing compounds, e.g., chlorine, iodine, fluorine or bromine, alkali metal salts of halogens, e.g., halides, chlorine dioxide, etc; iodide of a heavy metal cation; ammonium iodide; iodine-potassium iodide; an alkaline metal iodide; etheylenediamine dihydroiodide; hypochlorite ions ($OCl^-$ such as NaOCl, $NaOCl_2$, $NaOCl_3$, $NaOCl_4$, $Ca(OCl)_2$, $NaClO_3$, $NaClO_2$, etc.); vanadium oxytrichloride; Fenton's reagent; hypobromite ions; chlorine dioxine; iodate $IO_3$ (such as potassium iodate $KIO_3$ and sodium iodate $NaIO_3$); monopersulfate; alkali salts of peroxide like calcium hydroxide; peroxidases that are capable of oxidizing iodide; oxides, peroxides and mixed oxides, including oxyhalites, their acids and salts thereof. In one embodiment, the fixing agent is selected from $KMnO_4$, $K_2S_2O_8$, $K_2CrO_7$, and $Cl_2$. In another embodiment, the fixing agent is selected from the group of persulfates. In yet another embodiment, the fixing agent is selected from the group of sodium perborate, potassium perborate, sodium carbonate perhydrate, potassium peroxymonosulfate, sodium peroxocarbonate, sodium peroxodicarbonate, and mixtures thereof.

In one embodiment in addition to at least a fixing agent, a complexing agent is also added to the fixing agent to form strong complexes with the heavy metal cations in the produced fluids, e.g., $Hg^{2+}$, extracting heavy metal complexes from the oil phase and/or the interface phase of the oil-water emulsion into the dilution fluid by forming soluble complexes. Examples of complexing agents to be added to an oxidizing fixing agent include hydrazines, sodium metabisulfite ($Na_2S_2O_5$), sodium thiosulfate ($Na_2S_2O_3$), thiourea, thiosulfates (such as $Na_2S_2O_3$), ethylenediaminetetraacetic acid, and combinations thereof. In one embodiment with the addition of a complexing agent to a fixing agent, the fixing agent is added to the dilution fluid for injection into formation first to oxidize the heavy metal, then the complexing agent is subsequently added to form a complex that is soluble in water. The complexing agent can be injected at intervals into the formation, or it can be subsequently added after the introduction of the fixing agent to the formation for the in-situ reaction.

In one embodiment with the injection of sulfur-based compound as a fixing agent, an oxidizing agent such as bleach, peroxide, etc. is also added to oxidize the sulfur to mitigate souring of the reservoir. In another embodiment, an anti-oxidant is added to the dilution fluid for the removal of any excess oxygen.

In one embodiment, the fixing agent reacts with heavy metals such mercury, forming insoluble heavy metal complexes, e.g., mercury sulfide, which precipitate out of the hydrocarbons and dilution fluid and at least a portion remains in the reservoir. Examples of fixing agents of this type may include sodium polysulfide, or polymeric compounds containing sulfide functional groups.

The fixing agent can be added as in a solid form, or slurried/dissolved in a diluent, e.g., water, alcohol (such as methanol, ethanol, propanol), a light hydrocarbon diluent, or combinations thereof, in an amount sufficient for a molar ratio of fixing agent to heavy metals ranging from 1:1 to 20,000:1 in one embodiment; from 50:1 to 10,000:1 in a second embodiment; from 100:1 to 5,000:1 in a third embodiment; and from 150:1 to 500:1 in a fourth embodiment. If a complexing agent is to be added to the in-situ reaction to effectively stabilize (forming complexes with) soluble heavy metals, e.g., mercury, in the oil-water mixture, the amount as molar ratio of complexing agent to soluble mercury ranges from 2:1 to about 3,000:1 from one embodiment; from 5:1 to about 1,000:1 in a second embodiment; and from 20:1 to 500:1 in a third embodiment.

Figures Illustrating Embodiments: Reference will be made to the figures to further illustrate embodiments of the invention.

Referring now to FIG. 1 for an embodiment of an in-situ mercury removal system 200. In-situ system 200 includes body of water 202, formation 204, formation 206, and formation 208. Production facility including processing equipment for the separation of water containing mercury complexes from the treated crude may be provided at the surface of body of water 202. Dilution fluid such as water containing a fixing agent is pumped down well 232, to fractured portions 234 of formation 206. Water containing a fixing agent traverses formation 206 to aid the in-situ removal of mercury and the production of oil and gas going to well 212 and subsequently to production facility 210.

Well 212 traverses body of water 202 and formation 204, and has openings at formation 206. Portions of formation may be fractured and/or perforated as shown at 214. Water containing fixing agent(s) may be injected under pressure into injection zones 234 formed in the subsurface formation 206 to stimulate hydrocarbon production through the production wells in a field, and facilitate the mixing of the produced fluids with the fixing agent for the in-situ removal of mercury. Instead of or in addition to water storage facility 230, sea water (for offshore wells) and brine produced from the same or nearby formations (for onshore wells) may be used as the water source to pump down well 232. Produced fluids from the earth's subsurface formation 206 can be recovered through production wellbore 212 with perforations 206 that penetrate hydrocarbon-bearing formations or reservoirs, facilitating the flow of the "treated" produced fluids as well from the hydrocarbon-bearing formations to the production wellbores.

As oil and gas is produced from formation 206 it enters portions 214, with mercury being extracted from the oil and gas into the water 202 in the process, and travels up well 212 to separation facility 210. Gas and liquid may be separated, with gas being sent to gas storage 216, and treated crude to liquid storage 218, and water to water storage 230.

In one embodiment, water production facility includes equipment to process water, for example from body of produced water 202 and/or waste water containing extracted mercury from well 212. The recycled water may be processed and stored in water storage 230 for recycle, for example by re-injection into well 232.

Figure 2:
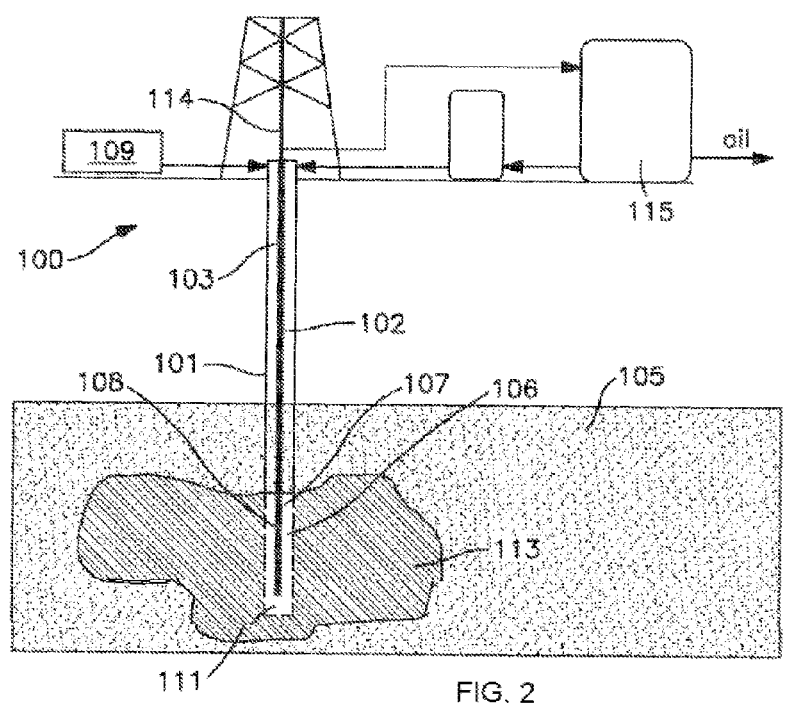
FIG. 2 is a diagram of a second embodiment of an in-situ system for the simultaneous recovery of oil and removal of heavy metals from the recovered oil.

FIG. 2 illustrates a second embodiment of a system 100 for the in-situ removal of heavy metals from a produced fluid. A vertical wellbore 101 comprising an outer sleeve 102 and an inner bore 103 driven into reservoir 105 is connected to a bottom wellbore portion 106. The bottom wellbore portion 106 comprises a perforated liner section 107 and an inner bore 108.

In operation, dilution fluid, e.g., produced water from water source 109 and the fixing agent is pumped down outer sleeve 102 to perforated liner section 107, where the injected water percolates into reservoir 105 and penetrates reservoir materials to yield a reservoir penetration zone. Crude oil in the formation flows down and collects at or around the toe 111 and may be pumped by a surface pump through inner bores 108 and 103 through a motor at the wellhead 114 to a production tank 115 where oil and the water mixture containing extracted heavy metal complexes are separated. The wastewater may be treated and recycled back into the reservoir as shown.

EXAMPLES

The following examples are given to illustrate the present invention. However, that the invention is not limited to the specific conditions or details described in these examples.

Example 1

100 gram sample of formation material obtained from a drilling operation is crushed to 8-16 mesh and soaked in a solution of 1 wt % sodium sulfide (equivalent to 0.4 wt % sulfur) for at least 48 hours. The sample is placed into a glass tube, and a crude oil containing 444 ppb of mercury is pumped through the tube at room temperature at an equivalent rate of 0.1 m/day. Samples of the treated crude are collected and analyzed for mercury. It is anticipated that the mercury content in the crude to be reduced to at least 75%.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for recovering hydrocarbons from a subterranean hydrocarbon-bearing formation while simultaneously removing heavy metals from the hydrocarbons, comprising:
   providing a dilution fluid containing a fixing agent dissolved in a diluent;
   injecting the dilution fluid containing the fixing agent dissolved in a diluent into the formation;
   exposing the heavy metals in the hydrocarbons in the formation to the fixing agent in the dilution fluid for the fixing agent to react in-situ in the formation with the heavy metals forming heavy metal complexes in the dilution fluid; and
   recovering the hydrocarbons having a reduced concentration of heavy metals and the dilution fluid containing the heavy metal complexes as a mixture from the formation via a production well.

2. The method of claim 1, further comprising:
   separating the dilution fluid containing the heavy metal complexes from the hydrocarbons for treated hydrocarbons having a reduced concentration of heavy metals.

3. The method of claim 2, further comprising recovering the dilution fluid after the separating step for injection into an oil or gas reservoir.

4. The method of claim 2, wherein the heavy metals contain mercury and the treated hydrocarbons has a mercury concentration of less than 100 ppbw.

5. The method of claim 1, wherein at least a portion of the heavy metal complexes comprises insoluble heavy metal complexes, which precipitate out of the mixture of hydrocarbons and dilution fluid.

6. The method of claim 5, wherein at least a portion of the insoluble heavy metal complexes remain in the formation.

7. The method of claim 1, wherein the heavy metal complexes comprises soluble mercury compounds.

8. The method of claim 1, wherein the heavy metals in the hydrocarbons are exposed to the fixing agent at a molar ratio of fixing agent to heavy metals ranging from 1:1 to 20,000:1.

9. The method of claim 8, wherein the heavy metals in the hydrocarbons are exposed to the fixing agent at a molar ratio of fixing agent to heavy metals ranging from 5:1 to 10,000:1.

10. The method of claim 1, wherein the heavy metals contain mercury, the dilution fluid is water, the fixing agent is selected from organic polysulfides, alkali sulfides, alkali hydrosulfides, ammonium sulfides and mixtures thereof, and wherein the fixing agent reacts with mercury forming soluble mercury compounds in water.

11. The method of claim 10, wherein the fixing agent is selected from sodium sulfides, ammonium sulfides and mixtures thereof.

12. The method of claim 1, wherein the heavy metals contain mercury, the dilution fluid is water, the fixing agent is selected from sodium polysulfide, ammonium polysulfide, sulfide-containing polymer, alkali sulfides, alkali hydrosulfides, ammonium sulfides and mixtures thereof, and wherein the fixing agent reacts with mercury forming insoluble mercury complexes that precipitate in the formation to effect in-situ removal of mercury from produced hydrocarbons.

13. The method of claim 1, wherein the production well is an injection well alternatively employed in a production mode.

14. A method for recovering hydrocarbons from a subterranean hydrocarbon-bearing formation while simultaneously removing heavy metals from the hydrocarbons, comprising:
   providing a dilution fluid containing a fixing agent dissolved in a diluent;
   injecting the dilution fluid containing the fixing agent dissolved in a diluent into the hydrocarbon-bearing formation for the dilution fluid to flow through fractures in the formation for the fixing agent to react with at least a portion of the heavy metals in-situ in the formation forming heavy metal complexes in the dilution fluid; and
   recovering the dilution fluid containing the heavy metal complexes and hydrocarbons having a reduced concentration of heavy metals from the formation via a production well.

15. The method of claim 14, wherein at least of a portion of the fixing agent is adsorbed into the fractures.

16. The method of claim 14, wherein at least a portion of the heavy metal complexes remains in the formation as insoluble heavy metal complexes.

17. The method of claim 14, wherein at least a portion of the fixing agent diffuses into the fractures in the formation and react with the heavy metals for a period of at least 2 hours.

18. The method of claim 14, wherein the heavy metals contain mercury, the dilution fluid is water, the fixing agent is selected from sodium polysulfide, ammonium polysulfide, sulfide-containing polymer, alkali sulfides, alkali hydrosulfides, ammonium sulfides and mixtures thereof, and wherein the fixing agent reacts with mercury forming insoluble mercury complexes that precipitate in the formation to effect in-situ removal of mercury from produced hydrocarbons.

19. The method of claim 14, further comprising separating the dilution fluid from the hydrocarbons to recover treated hydrocarbons having a reduced concentration of heavy metals.

20. The method of claim 19, further comprising recovering the dilution fluid after the separating step for injection into an oil or gas reservoir.

21. The method of claim 14, wherein the dilution fluid comprises produced water and the heavy metals comprise mercury.

22. A method for recovering hydrocarbons from a subterranean hydrocarbon-bearing formation while simultaneously removing heavy metals from the hydrocarbons, comprising:
   providing a dilution fluid containing a fixing agent dissolved in a diluent;
   injecting a dilution fluid containing a fixing agent dissolved in a diluent into the hydrocarbon-bearing formation to expose the heavy metals in the hydrocarbons to the fixing agent in the dilution fluid for the fixing agent to react with at least a portion of the heavy metals in-situ in the formation forming heavy metal compounds that remain in the formation; and
   recovering the hydrocarbons and the dilution fluid from the formation via a production well as a mixture;
   wherein the recovered hydrocarbons have a concentration of heavy metals less than the concentration of heavy metals in the hydrocarbons in the formation.

23. The method of claim 22, wherein the heavy metals in the hydrocarbons are exposed to the fixing agent at a molar ratio of fixing agent to heavy metals ranging from 1:1 to 20,000:1.

24. The method of claim 22, wherein the production well is an injection well alternatively employed in a production mode.

* * * * *